July 1, 1924.

V. SHUMAN

INDICATOR PLATE

Filed Nov. 18, 1920

1,500,039

INVENTOR.
Victor Shuman
By
attorney.

Patented July 1, 1924.

1,500,039

UNITED STATES PATENT OFFICE.

VICTOR SHUMAN, OF PHILADELPHIA, PENNSYLVANIA, ASSIGNOR, BY MESNE ASSIGNMENTS, TO LOUIS J. KOLB, TRADING AS SAFETEE GLASS COMPANY, OF PHILADELPHIA, PENNSYLVANIA.

INDICATOR PLATE.

Application filed November 18, 1920. Serial No. 424,813.

*To all whom it may concern:*

Be it known that I, VICTOR SHUMAN, a citizen of the United States, and resident of Philadelphia, county of Philadelphia, and State of Pennsylvania, have invented an Improvement in Indicator Plates, of which the following is a specification.

The object of my invention is to provide a construction of indicator plates suitable for dials or other devices for indicating by means of pointers or otherwise certain conditions such as temperatures, pressures, voltages, amperes, etc., which shall be transparent or translucent to light and at the same time shall be cheap and durable in construction and proof against injury from vapors and volts having a corrosive tendency.

In embodying my invention in its practical form, I provide a three-ply plate formed of two outer plates of glass and an intermediate sheet of pyroxylin compound such as celluloid which is welded or attached to the opposing faces of the two sheets of glass to form an integral structure, and printing or otherwise forming upon the surface of the celluloid sheet or upon one of the glass plates the symbols or marks which are to form a permanent part of the indicator in its complete form, and which printing or marking is hermetically sealed by being enclosed between the celluloid sheet and the front glass plate, all of which is more fully described hereinafter in connection with the drawings and defined in the claims.

Figure 1:
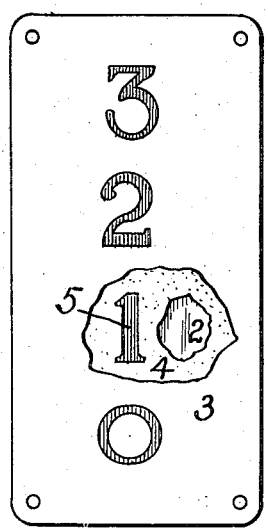
Figure 2:
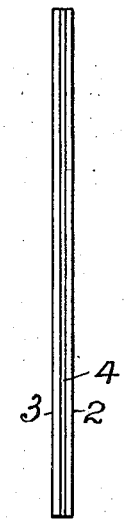
Figure 3:
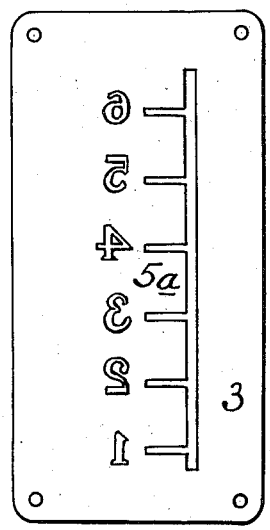
Figure 4:
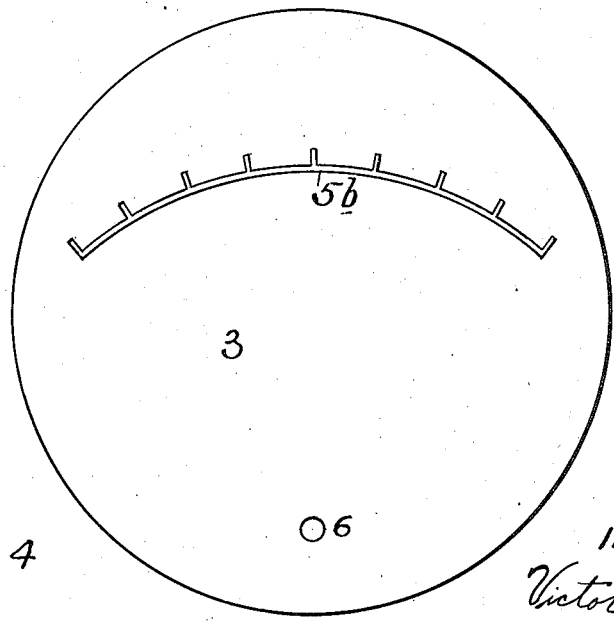

Referring to the drawings: Fig. 1 is a front elevation of an indicator plate embodying my invention and having portions of its layers broken away; Fig. 2 is an edge view of the same; Fig. 3 is a rear elevation of the front plate showing the designations or marks applied thereto by decalcomania, painting or otherwise, as distinguished from applying said marks to the celluloid; and Fig. 4 is a front elevation of a dial embodying my invention and suitable for gauges.

2 and 3 represent two sheets of glass and 4 represents a sheet of pyroxylin compound, such as celluloid welded or cemented in position between the two glass plates and uniting them to form an integral structure. In Fig. 1 are shown the numerals 0, 1, 2, 3, printed or formed upon the surface of the celluloid sheet 4, as indicated at 5, and which, when the said sheet and the front glass 3 are united, are hermetically sealed under the glass and in a position to which access cannot be had by vapors, gases or solutions. By making the pyroxylin compound transparent, an indicator plate or dial formed in this manner is suitable for use with measuring or indicating instruments adapted for use at night, by causing light from a lamp in the rear of the plate or dial to be projected through the plate or dial to bring out permanently the figures or marks thereon.

I do not confine myself to the printing or forming of the designations 5 upon the celluloid or pyroxylin sheet 4 as this may be formed on the back of the front glass plate 3, as indicated at 5ª in Fig. 3. It is immaterial just in what manner these figures or marks are applied, so long as they are introduced between the glass front and the celluloid or the pyroxylin sheet 4 which binds the two glass sheets 2 and 3 into integral structure. The pyroxylin sheet may be directly welded to the glass surfaces by heating and pressure or may be cemented to the sheet glass by a thin coating of pyroxylin compound applied to the inner surfaces of the glass sheets and which adhere to the celluloid or other pyroxylin sheet 4. When the translucent pyroxylin sheet is to be cemented to the glass plates, either a transparent varnish or a cement comprising pyroxylin compound and a solvent, such as acetone, therefor, or a gelatine cement may be employed as the direct means for attaching the glass to the sheet of celluloid and hermetically sealing the designations 5, 5ª or 5ᵇ within the compound sheet and back of the front glass plate 3. In the case of applying the designations by means of decalcomania, the varnish layer with the print thereon, are transferred from the paper directly upon the back of the front glass sheet 3, as indicated in Fig. 3, and it will be understood that in a generic sense the same result may be accomplished by printing designations upon a thin transparent or translucent sheet of paper which may be similarly employed on the back of the front sheet of glass and be hermetically sealed between the two glass sheets by means of the pyroxylin or cementing compound.

In all of these cases the figures or other designations of the indicator plate are sealed between glass plates so that they are proof against the action of vapors or gases or even the ordinary atmosphere, and consequently an indicator plate of the construction herein described is permanent and practically indestructible. Moreover, if from any reason the plate became cracked, the presence of the pyroxylin sheet or other uniting intermediate layer or layers will hold the various cracked portions of the glass in proper co-relation so that the indicator plate as a whole retains its general shape and utility, and may be conveniently employed for a long period of time pending the replacing by a new plate.

It will now be apparent that I have devised a novel and useful construction which embodies the features of advantage enumerated as desirable, and while I have in the present instance shown and described the preferred embodiment thereof which has been found in practice to give satisfactory and reliable results, it is to be understood that I do not restrict myself to the details, as the same are susceptible of modification in various particulars without departing from the spirit or scope of the invention.

Having now described my invention, what I claim as new and desire to secure by Letters Patent, is:—

1. A device of the character stated, consisting of two plates of glass united to form a unitary structure by an interposed continuous translucent layer having its opposite surfaces directly attached to the opposing surfaces of the respective glass plates and thereby directly securing them together and hermetically sealing the space between them, and indicator character enclosed between the glass plates and closer to one of them than the other, so as to be clearly seen through it and at the same time hermetically sealed from the atmosphere.

2. The invention according to claim 1, wherein the interposed translucent uniting layer includes a sheet of pyroxylin.

3. A device of the character stated, consisting of two plates of glass united to form a unitary structure by an interposed continuous translucent layer having its opposite surfaces directly attached to the opposing surfaces of the respective glass plates and thereby directly securing them together and hermetically sealing the space between them, and indicator characters enclosed between the glass plates and closer to one of them than the other, so as to be clearly seen through it and at the same time hermetically sealed from the atmosphere, the interposed translucent uniting layer including a sheet of pyroxylin, and wherein further, the indicator characters are formed upon one surface of said sheet of pyroxylin.

4. A device of the character stated, consisting of a compound plate structure translucent to light and comprising two outer superposed plates of glass, an interposed translucent layer arranged between the glass plates and positively uniting them throughout their width and height, and relatively opaque indicator characters interposed between the translucent uniting layer and one of the glass plates and hermetically sealed from the atmosphere.

In testimony of which invention, I hereunto set my hand.

VICTOR SHUMAN.